(12) United States Patent
Bevan et al.

(10) Patent No.: US 6,798,766 B1
(45) Date of Patent: Sep. 28, 2004

(54) NETWORK TRANSFER SYSTEM

(75) Inventors: Wayne Bevan, San Jose, CA (US); Michael Ho, Portland, OR (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

(21) Appl. No.: 09/384,840

(22) Filed: Aug. 27, 1999

(51) Int. Cl.$^7$ ........................ H04M 3/100; H04M 7/00; H04L 12/66

(52) U.S. Cl. .................. 370/352; 370/356; 379/221.09; 379/221.12

(58) Field of Search ........................ 379/220.01, 221.01, 379/221.03, 221.04, 221.05, 221.06, 221.08, 221.09, 221.15, 225, 224, 234, 265.02, 265.06, 221.12, 242, 360, 367; 370/352, 353, 354, 355, 356

(56) References Cited

U.S. PATENT DOCUMENTS

| | | | |
|---|---|---|---|
| 5,555,299 A | * | 9/1996 | Maloney et al. ........ 379/212.01 |
| 5,684,870 A | * | 11/1997 | Maloney et al. ........ 379/212.01 |
| 5,915,012 A | * | 6/1999 | Miloslavsky |
| 6,064,667 A | * | 5/2000 | Gisby |
| 6,175,618 B1 | * | 1/2001 | Shah |
| 6,229,888 B1 | * | 5/2001 | Miloslavsky |
| 6,373,836 B1 | * | 4/2002 | Deryugin |
| 6,389,028 B1 | * | 5/2002 | Bondarenko |
| 6,393,122 B1 | * | 5/2002 | Belzile |
| 6,449,353 B1 | * | 9/2002 | Hynes |
| 6,456,615 B1 | * | 9/2002 | Kikinis |
| 2001/0053219 A1 | * | 12/2001 | Krank et al. ........... 379/265.02 |

* cited by examiner

*Primary Examiner*—Afsar Qureshi
(74) *Attorney, Agent, or Firm*—Blakely Sokoloff Taylor & Zafman LLP

(57) ABSTRACT

A network transfer system for transferring a voice call and data between two or more call centers linked by independent voice and data networks is disclosed. The system effects the transfer of the voice call over the voice network without requiring additional information to be transferred with the call. A network transfer module receives a request from the sending call center and directs the sending call center to connect the call to a specific address in a receiving call center. The network transfer module transfers the data to the call receptor in the receiving call center where it is associated with the address to which the call has been directed. The call receptor at the receiving call center assigns a time acceptance window to each call being sent so that data association with wrong numbers is minimized and the capability for queuing multiple calls at a singe address is established.

23 Claims, 6 Drawing Sheets

NETWORK TRANSFER SYSTEM

FIELD OF THE INVENTION

This invention relates to a system for transferring telephone calls and call associated data between different locations. In particular, the invention addresses the need for efficient coordination of voice and data for transfers made over separate voice and data networks.

BACKGROUND OF THE INVENTION

In today's call center industry, the "customer's call" is no longer just a simple single telephone call to a toll-free telephone number that enters the call center from one direct source such as the PSTN (Public Switched Telephone Network) and dealt with by a live agent handling customer queries. Telephone call and voice call refer to a connection that enables communication by voice. The connection is not necessarily a physical one, considering that electromagnetic radiation can be used as a voice carrier. Depending upon the systems used to establish the call, information other than that provided by the users voice may be transmitted during the course of the call. In addition to the traditional telephone call, the caller now has multiple ways to contact the same call center using a variety of new and evolving technologies. Among these methods of contact are IP (Internet Protocol) telephony, Interactive Voice Response systems (IVRs), customer self service applications, public kiosks, interactive TV or the worldwide web. Each of these methods can be used to contact the same call center. Within the call center many different systems and subsystems should be able to interact, share, and process the call, independent of the method by which the initial contact was made.

In the modern business environment the requirement for efficiency and flexibility has generated a need for associating various kinds of data with an incoming voice call. This data can be internally generated from sources such as a database containing caller account information, or it can be data obtained through interaction with the caller. Association of the data with the call is critical if efficient response is to be maintained as the call is transferred between subsystems or call centers. Call transfers can be vexing to a customer, particularly when a previously answered question must be answered again after a transfer, or a wait ensues as internal data is regenerated.

The call center today includes an array of different systems that are responsible for performing functions such as account balance inquiries, money transfer requests, etc. The set of functions required by a call center can vary significantly, depending upon the nature of the business enterprise that is being supported.

The call center is faced with the large and complex task of ensuring that call and data association is maintained throughout the overall network. This is a daunting task due to the lack of open standards and the burdens of proprietary interfaces and protocols. The goal of maintaining call and call data is often very difficult to undertake unless a common vendor has been chosen to implement a complete tailored solution for a call center. Often this is very expensive and limits a client as to what systems they can continue to add to their existing systems. In cases such as corporate mergers, disparate infrastructure and hardware vendors can make it difficult for the resulting combined system to accurately associate call and call data without high costs to the customer.

In view of the increased complexity of the multiple systems now involved in processing of the one customer's call the need for a system to coordinate the call and the associated data has become apparent.

FIG. 1 shows a schematic of a typical configuration for a system utilizing independent voice and data networks for transfer of voice and data between call centers. Call centers A and B are shown connected by independent voice and data networks. Although only two call centers are shown, a system may consist of a larger number of interconnected call centers, each of which may be unique in the types of hardware and software employed. The data network may include a combination of Wide Area Networks (WANs) and Local Area Networks (LANs). A typical data network might consist of a single WAN linked to a number of LANs, each LAN being associated with a call center.

In reference to FIG. 1 an incoming voice call (hereinafter referred to simply as a call) 1 arrives over the voice network 2 at call center A. The incoming call 1 is received by an initial call processing device 3. The initial call processing device can be an IVR, Automatic Call Distributor (ACD), Private Branch Exchange (PBX), or the like. The initial call processing device in turn may transfer the call to a terminal call processing device 4 such as a telephone set or IVR. In particular call center configurations, the initial call processing device 3 and terminal call processing device 4 may be a single device.

Data is be generated at an agent workstation 5 through interaction with the calling party. The agent workstation 5 may or may not include a human operator. At the point in time when the requirement for the transfer of the call and data arises, the system shown in FIG. 1 can be characterized as a set of domains. Call center A and its subsystems at this point becomes the call processing domain and call center B and its subsystems becomes the client domain. The domain attributed to a system is dependent upon the state of the hardware/software of the system and what its immediate task is. The call processing domain consists of a system that is undertaking the task of transferring voice and associated data over two independent networks, and the client domain consists of the system linked by the voice and data networks, to which the call is being transferred. In a telecommunications system such as that depicted in FIG. 1, either call center A or call center B may serve as a call processing domain or a client domain.

The efficiency of a telecommunications system that effects transfers of voice and associated data over independent networks can be evaluated by the amount of data that must be transmitted in order to maintain the association between the call and data, and the path over which that data is transmitted.

Conventional techniques require that an identifier be associated with the call that is being transferred from call center A to call center B, and that the identifier be passed with the call over the voice network 2. At the same time, the data associated with the call, and a reference to the call identifier are passed over a data network 10 between a server A 6 and a server B 9. Since both the call and data are tagged, initial call processing device B 7 and server B 9 are able to effect a reassociation of the call and data and route them to the appropriate agent workstation B 11 and terminal call processing device B 8. The call destination is not unique, and the identifier passed with the call is necessary for successful reassociation of the data.

Existing systems rely on modifications of data passed with the voice call, such as Automatic Number Identification (ANI) and Dialed Number Identification Service (DNIS), to represent a data key. Alternatively, systems may require a defined telecommunications infrastructure (including both transition media and receiving hardware) utilizing techniques such as Integrated Services Digital Network User-to-User Information (ISDN UUI) level fields or inbound Dual-Tone Multi-frequency (DTMF) tones to support the transferring of a voice call with associated data. In these systems, identifier data generated externally to the call center is required for call and data association.

Existing systems are specific to a defined telecommunications infrastructure or hardware interfaces and as such can not be reused or deployed into other systems without revision. Many existing systems also require a minimum amount of transmitted information with the call such as DNIS to uniquely identify the call. This means that the existing systems would be unable to be deployed into a situation that does not support additional transmitted data either inband (data transmitted by tones within the voice frequency band) or outband (data transmitted by tones outside of the voice frequency band) across media such as circuit switched to packet switched networks without using proprietary protocols and/or hardware.

As an example, the transmission of DTMF tones can reduce the effectiveness of a call transfer depending on the length of the data key required to be generated. Typically, it would require 0.25 seconds to transmit DTMF tones to pass a data key inband and be recognized by a tone receiver at the destination. This delay reduces the real call processing time and would vary depending on the length of the key transmitted. Such delays increase the call processing time and reduce the throughput of a system.

In general, the voice network 2 (FIG. 1) will have less bandwidth than the data network 10. It is desirable to minimize the amount of required additional data that must be transferred with the call.

FIG. 2 shows the two call centers referred to in FIG. 1 in the process of transferring a call and associated data. At the time a transfer of a call and data is being made between two call centers, the call center from which the call is being transferred can be described as the call processing domain and the call center to which the call is being transferred can be described as the client domain. In general, any two systems involved in the transfer of a call and associated data over a voice network and a data network can be described as a combination of a call processing domain and a client domain. In conventional call transfers, the call processing domain transfers the call and additional identifier data over the voice network while transferring the associated data over the data network.

Although existing systems are capable of transferring calls and associated data between different call centers, they require the increased overhead of additional data transmission that is extraneous to the data associated with the call.

SUMMARY OF THE INVENTION

The present invention provides a system that is capable of transferring a telephone call and associated data between locations using disparate equipment and software.

Embodiments of the invention provide a system that is capable of effecting the transfer of a telephone call and associated data without requiring additional externally generated data that is extraneous to the call.

The problem of call and data association arises when a call is transferred between two dissimilar systems such as a networked IVR and an ACD or two ACDs separated by local PSTN or Tie Lines.

A Network Transfer System (NTS) normalizes the transfer of a call by using the knowledge of the call transfer destination to provide a control point within the client domain. The use of the NTS establishes a bidirectional data flow while eliminating the requirement for passing an identifier with the call over the voice network. Data is transmitted between the call processing domain and the client domain over the data network and is normalized to provide a unique identifier for the data and its associated call. NTS requires only that the call be transmitted over the voice network between the call processing domain and the client domain; no additional information such as ANI, DNIS, DTMF tones, or the like are required for calls to be transferred with associated data.

NTS obviates the requirement for the voice network to transmit extra data, and also makes unnecessary the requirement for the receiving interface to interpret the additional transmitted data. The invention does not rely on any data generated external to the call processing domain, and does not rely on data passed over the voice network to maintain association of the call and call data.

DETAILED DESCRIPTION

Figure 1:
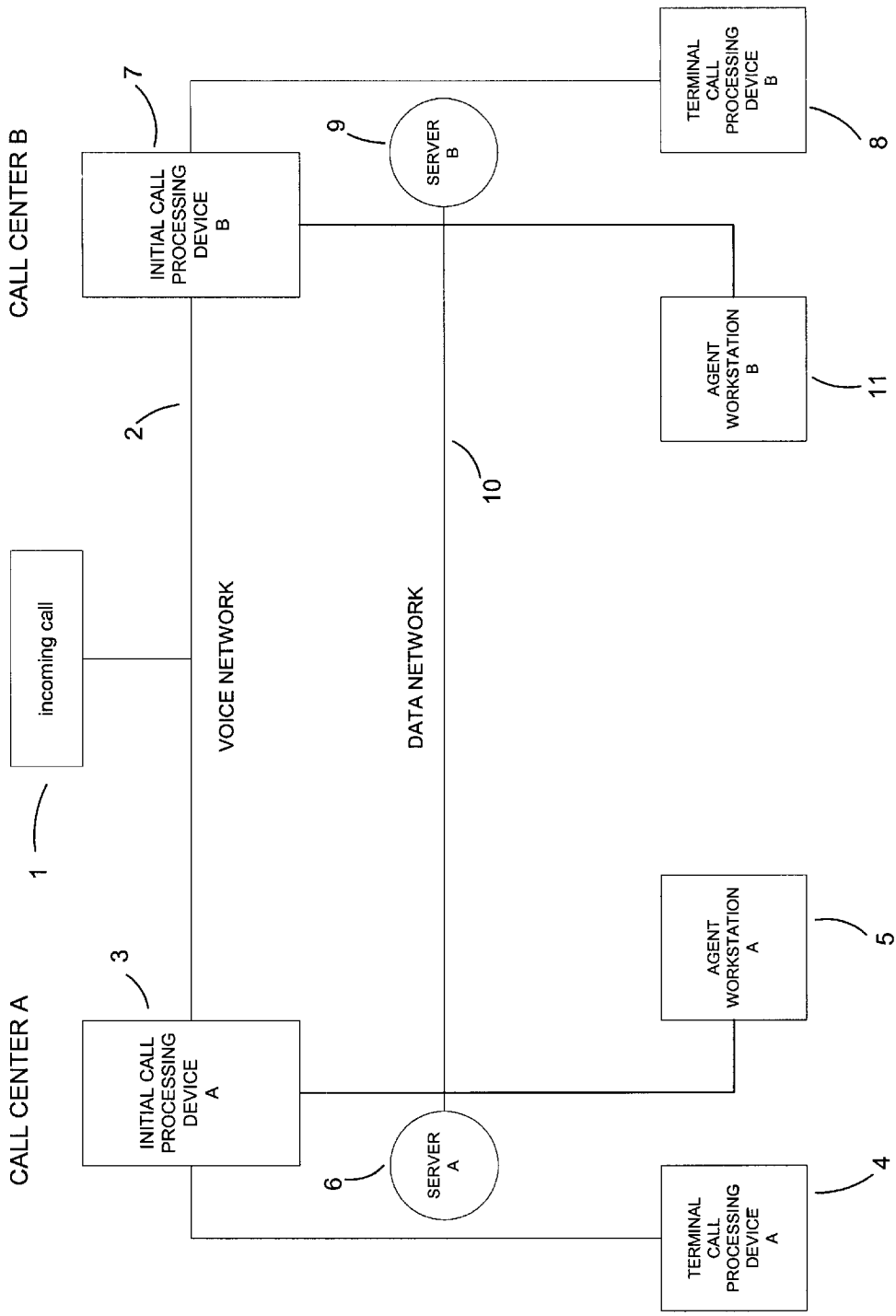
FIG. 1 depicts two conventional call centers linked by independent voice and data networks.
Figure 2:
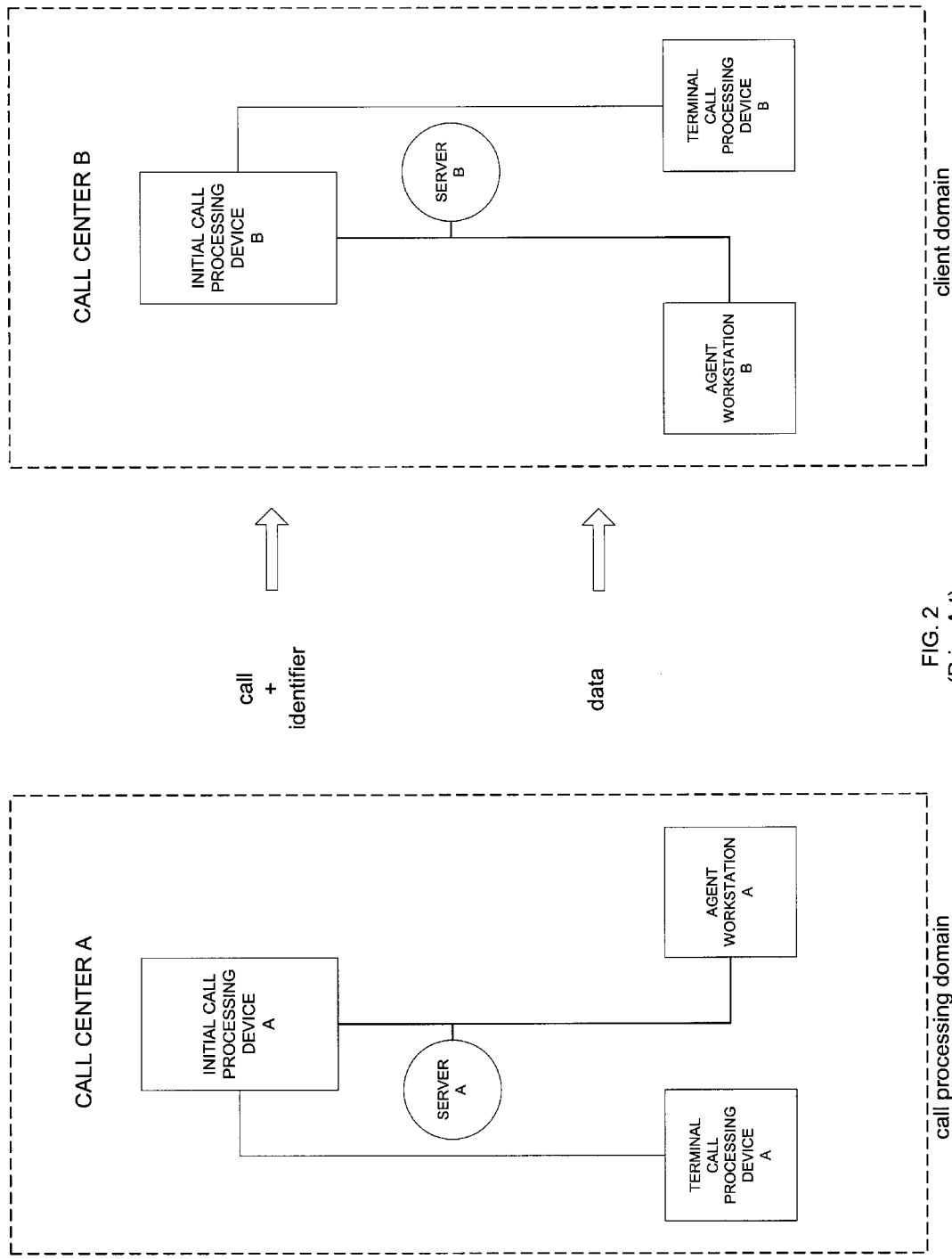
FIG. 2 depicts the conventional information flow between the call processing domain and the client domain.
Figure 3:
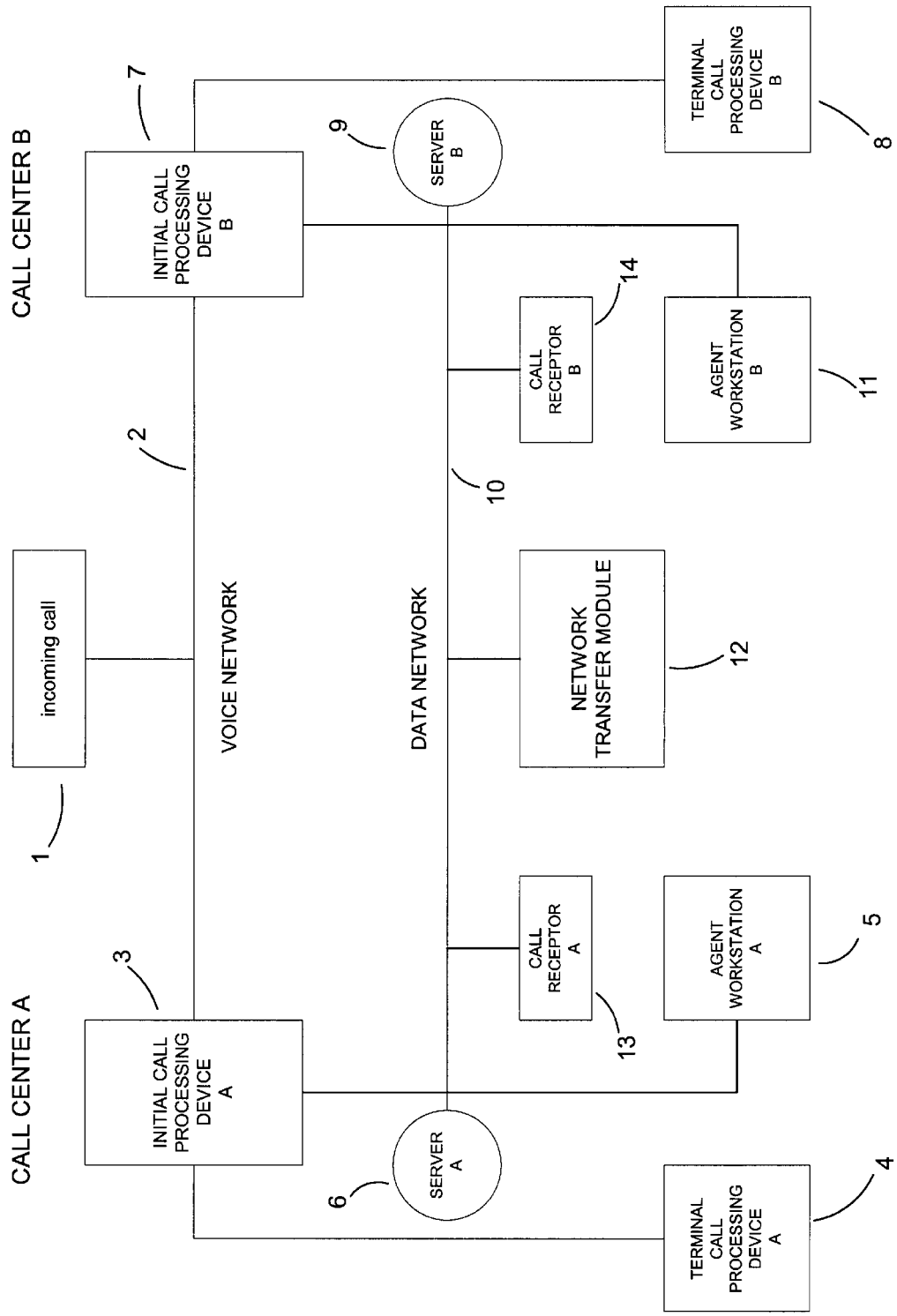
FIG. 3 depicts two call centers linked by independent voice and data networks with the addition of a network transfer system consisting of a network transfer module and two call receptors.

FIG. 3 shows a call center A and a call center B linked by a voice network 2 and a data network 10 as shown in FIG. 1, but with the addition of a network transfer system (NTS) consisting of a network transfer module (NTM) 12, a call receptor A 13, and a call receptor B 14. The three components within the NTS provide distinct functionality and also a level of abstraction from the underlying ACD hardware and protocols being used. This allows for a flexible yet consistent interface to the users of this system regardless of the local ACD configuration. In one embodiment, the NTM resides on a Wide Area Network (WAN)linking two or more call centers, while the call receptor associated with each call center resides on a Local Area Network (LAN) within the call center. The network transfer module (NTM) is the heart of the NTS. This module is responsible for ensuring that data is transferred between the call processing domain and the client domain. The NTM communicates with each call center through the call receptor associated with that specific call center. The call receptor in turn has the capability to communicate with the other components on the data network such as the server, initial call processing device and agent workstation.

The call receptor associates a call and data together in the client domain. In FIG. 3, call receptor A and call receptor B may or may not be alike. In one embodiment, the call receptors all provide the same functionality in that they associate a call and data. However due to the differences in Computer-Telephony Integration (CTI) links, ACD messages and general architecture differences a specific call receptor is required for each ACD platform and CTI server combination within a call center.

Figure 4:
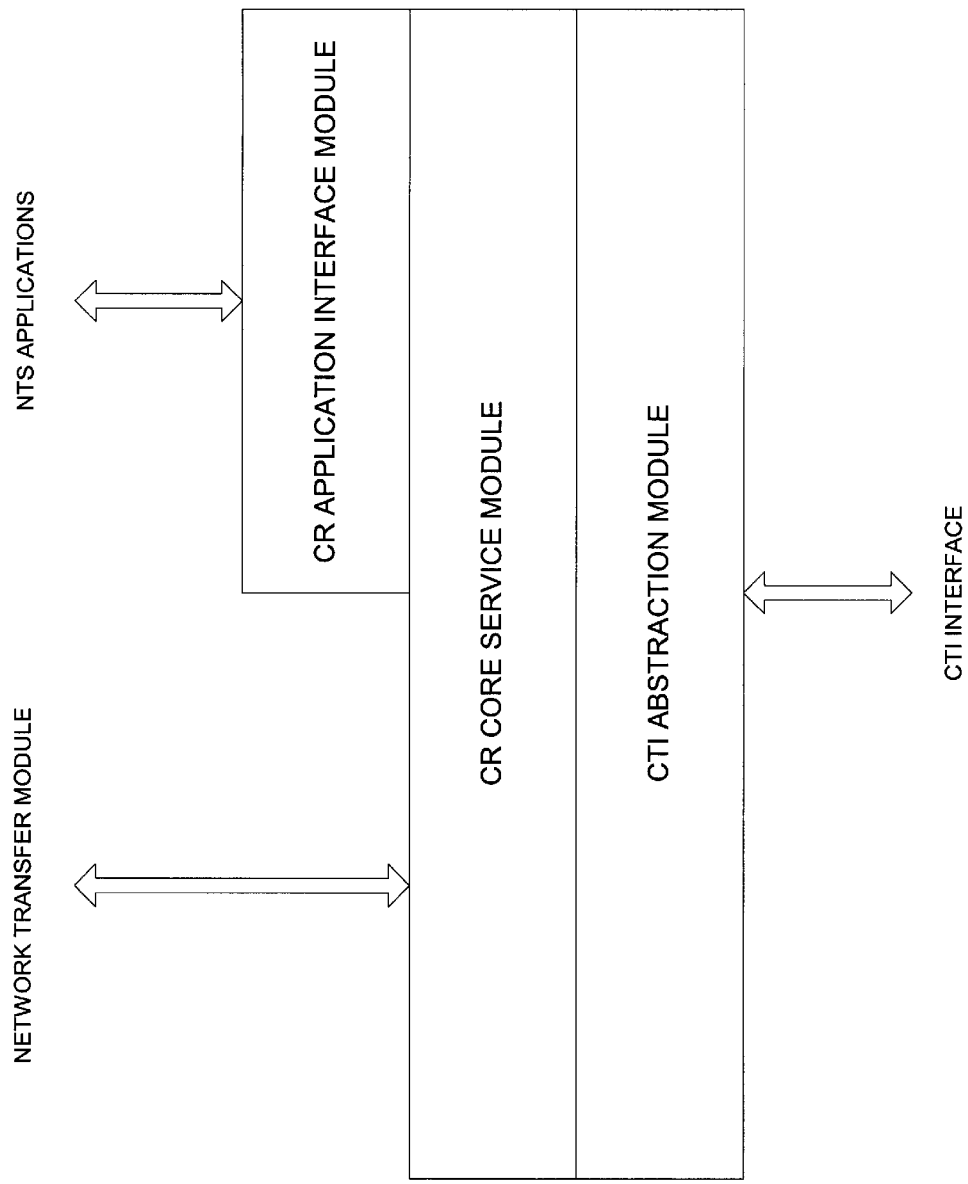
FIG. 4 depicts the functional modules of the call receptor.

FIG. 4 shows modules that make up the call receptor. The call receptor Application Interface Module(AIM) enables applications to connect to and request the services of the NTS. The call receptor AIM supports a defined set of interfaces to enable applications within the call processing domain to access the functions of the NTS application. Applications make or receive NTS requests via the call receptor AIM. NTS applications interface with the call receptor AIM via appropriate messaging protocols such as, but not limited to TCP/IP and appropriate interfacing such as C API's, or other similar application technologies that can be applied to a networked server architecture.

The call receptor Core Service Module(CSM) provides the generic functions of the call receptor. These functions encompass the processing of the call transfer requests involving the associated call center and the handling of call and data matching together with error handling. The CSM is responsible for maintaining a network connection to the NTM and performing any error recovery actions required such as error notification or switching to an alternative NTM module if redundant modules are employed.

The call receptor CTI Abstraction Module enables a call receptor to integrate into any voice processing unit (VPU) or call processing device and CTI environment by mapping CTI messages and events supplied across a CTI interface or the like onto specific call receptor Core Service module interfaces. This enables the call receptor to be employed in a variety of environments and maintains the generic functionality of the call receptor. The call receptor CTI Abstraction Module is specific to the type of voice processing hardware and software configurations used.

In reference to FIG. 3, the NTM 12 maintains a pool of control point addresses that are available for allocation to calls for which transfers have been requested. When the NTM receives a call transfer request from within the call processing domain, it responds with an allocated address (also known as a control point address) within the client domain for the application to contact. At the same time that the allocated control point address is passed to the requesting application within the call processing domain, the NTM passes the call associated data to the call receptor along with a control point identifier. The control point identifier has a one-to-one correspondence with the control point address. The identified control point is a point within the client domain from which a message is sent to the call receptor upon receipt of the transferred call at the corresponding control point address.

Available control points are determined by the system architecture. Examples of control points include the Call Control Table in Automatic Call Distributors (ACDS) manufactured by Aspect Telecommunications Corporation of San Jose, Calif., the Control Device Number in systems available from Nortel Networks Corporation of Ontario, Canada, and the Vector in systems available from Lucent Technologies Inc. of Murray Hill, N.J. Control points in these systems are not necessarily limited to the examples provided.

The call receptor enhances the reliability of call data association in the client domain by using call matching logic. Call matching logic uses a time stamp and user-adjustable parameters to create a time acceptance window for the call at the control point address. The passed call data is registered with the specific control point address within the client domain, together with a local time stamp. The local time stamp enables the call receptor to determine if the call has actually expired and that the call did not arrive. This allows for the release of the control point address. When data is registered with the call receptor it has a period of time that ensures that a call cannot match against it. This is to reduce the possibility of associating call data with erroneous calls that may have been initiated to the control point address.

The time before activation is the difference from the creation time (CT) of the call data element within the call receptor plus the average message latency (AML) between the various NTS modules such as the client, NTS, client domain, call receptor and NTM modules, plus the average call set up time (ACST) minus a user determined threshold value. To determine the latency (AML), 'ping' messages are used which indicate both the time differential and also ensures that processes are alive. Both AML and ACST are calculated on a per call receptor basis and stored within the NTM process. The threshold value is a user supplied constant that is supplied as a tuning parameter that is selected to establish a desired balance between the probabilities of valid call rejection and wrong number acceptance. The NTM process periodically updates the values within the call receptor.

$$\text{Activation Time}=CT+AML+ACST-\text{Threshold}$$

The time activation mechanism is used when a call is supplied with no ANI to match on a call and effectively would imply that the call would be open to be matched against any call that has been registered for that control point address within the NTS application.

The Activation Time establishes the earliest point in time that a call can be accepted at a control point, and the Expiration Time establishes the latest point in time at which the call can be answered. The Expiration Time is adjustable and has a nominal value on the order of thirty seconds.

The NTM is responsible for maintaining the data connection to all call centers within the telephone network and also for informing the applications within the domains of any errors that occur, such as no data connection to remote host or invalid parameters specified in the supplied requests. The NTM also hides or abstracts the architecture of the client domain. Client requests are made irrespective of the architectural differences between the call processing domain and the client domain. This allows for a heterogeneous system and facilitates the data transfer between various switches such as switches available from Aspect Telecommunications Corporation, Nortel Networks Corporation, Lucent Technologies Inc., and Rockwell International.

The call receptor also supplies a limited call routing capability once the call has entered the client domain. The call receptor is able to route calls directly to an extension or to a queue on the destination node. This feature allows, for example, a single control point address to serve many customer applications such as Sales, Customer service, etc.

At startup the NTM reads its configuration from a suitable repository such as a database or local file, that describes the network transfer environment. This repository contains information about each of the call centers on the network and the control point addresses that can be used within each call center.

Although the system can be configured with the optimal number of control point addresses within a call center (determined by various algorithms and call center rules) there is always the chance that the number of concurrent transfer request will be greater than the number of available control point addresses to the destination node.

The NTS allows the user to indicate that certain control point addresses can accept multiple transfer requests. This capability is enabled by the timestamp and the acceptance time window defined by the Activation threshold and Expiration Time within the call receptor. When more than one call is transferred to the same control point address, the call matching logic sets the Activation Threshold and Expiration Time parameters so that the resulting acceptance time windows do not overlap. This allows the client domain to handle a number of calls that is greater than the number of control point addresses.

It is not expected that a user would indicate that all of the control point addresses within the pool allow multiple calls. This would suggest that the number of control point addresses is too small and should be adjusted accordingly.

In the case where no control point addresses have been indicated to allow multiple calls and all of the control point addresses have been allocated and not yet freed the NTM will refuse requests for a transfer until a control point address becomes available.

Figure 5:
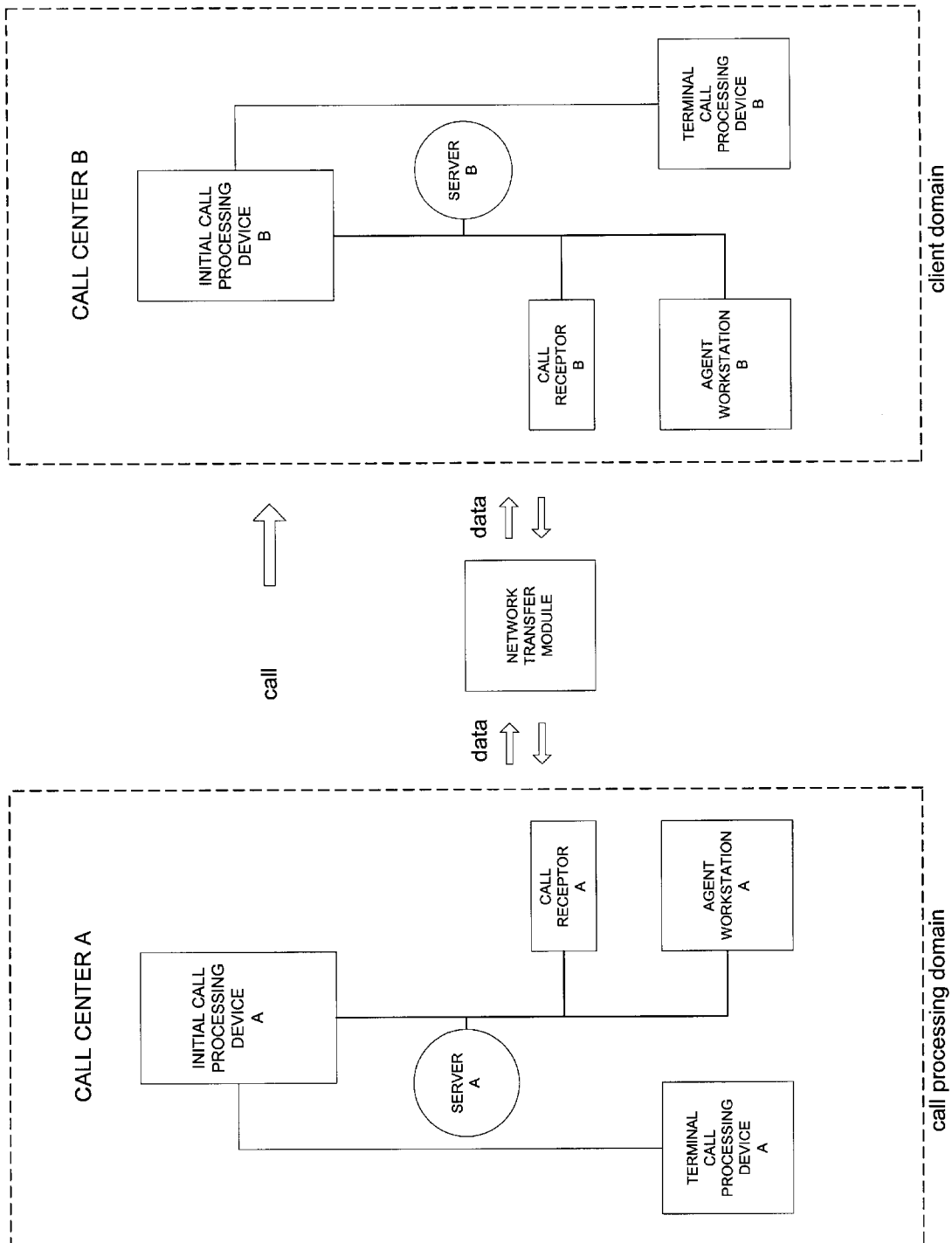
FIG. 5 depicts the information flow between the call processing domain and client domain under management of the network transfer system.

FIG. 5 shows the information flow between the call processing domain and the client domain in a telecommunications network using the NTS. During the transfer of a call and its associated data, only the call is transferred over the voice network, while the data required for the transfer request, call/data association, and the completion of the transfer is passed over data network through the NTM.

Figure 6:
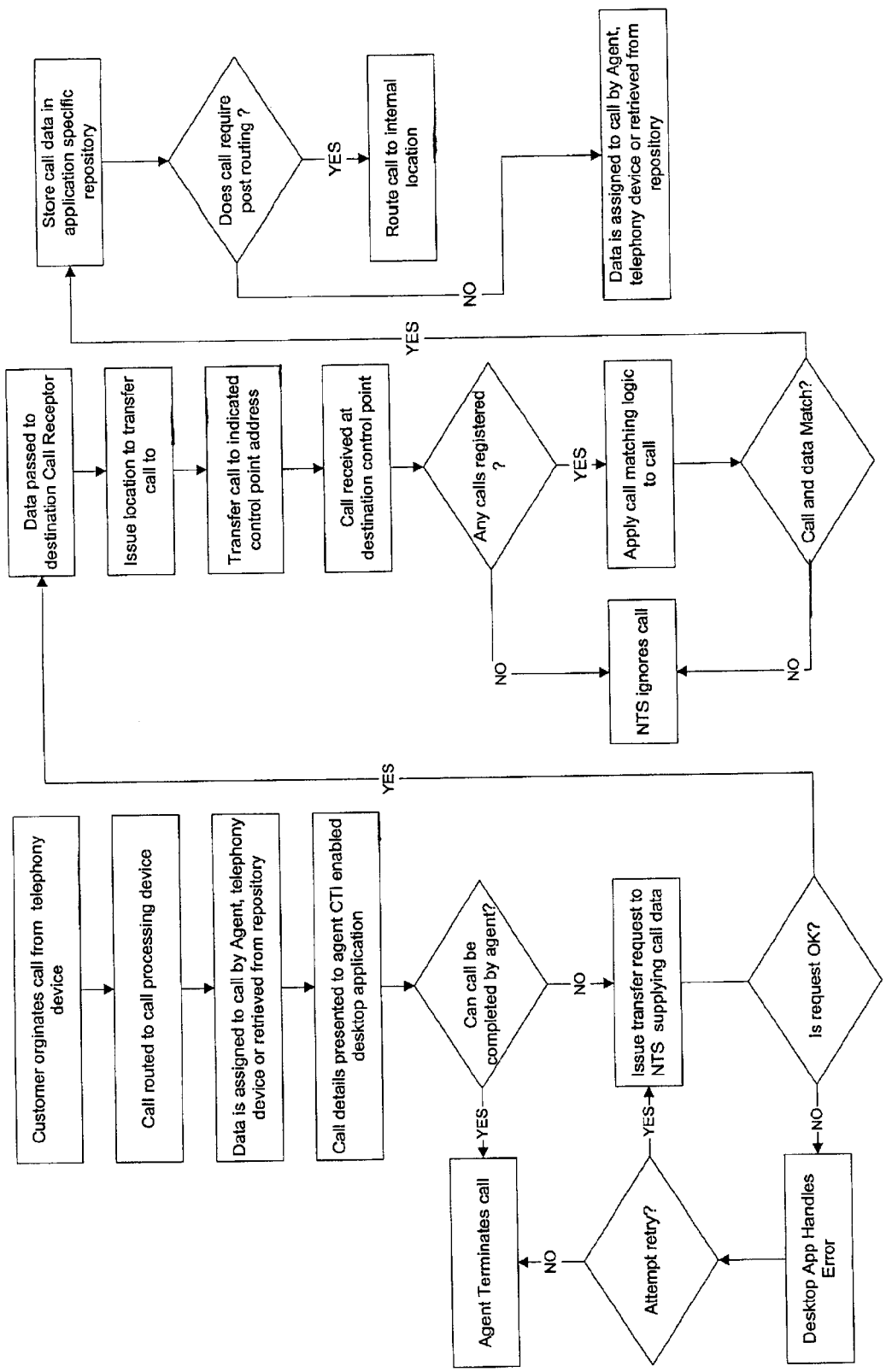
FIG. 6 shows the overall process flow for the network transfer system.

FIG. 6 shows an example of the overall process flow for the NTS. Since there are many possible call center configurations, the diagram is not representative of all possible implementations. The process begins with a call originated by a customer using a telephony device. Once the call is received at the call center, it is routed to a call processing device; in this example, an agent. As a result of interaction with the agent, data is received from the customer or retrieved from a repository such as an account database. If the agent is able to complete the transaction with the customer, no transfer is necessary, but if the agent is unable to complete the transaction, the call and data must be transferred. The agent's transfer request is passed to the NTS and if the transfer cannot be made the agent has the option of attempting the transfer again or terminating the call. If the transfer can be made, the data associated with the call is passed to the destination call receptor, and the agent is informed of the location to which the call is to be transferred. At this point the call is transferred to the destination call center. The transfer process continues when a call is received at the destination control point. If there are no calls registered with the control point, the NTS ignores the call. If there are calls registered, the NTS applies call matching logic to determine whether the call matches a data set in the call receptor. If there is not a match, the NTS ignores the call. If there is a match, the data is stored in an application specific repository where it is available to the agents handling incoming calls. If the call requires post routing it is transferred internally, if not, the agent proceeds to interact with the customer, acquiring additional data from the customer and/or retrieving the transferred data from the repository.

Although the invention has been described in language specific to structural features and/or methodological steps, it is to be understood that the invention defined in the appended claims is not necessarily limited to the specific features or steps described. Rather, the specific features and steps are disclosed as particular embodiments of implementing the claimed invention.

What is claimed:

1. A telecommunications system including:
   a first call center coupled to a data network and a first call receptor coupled to the data network;
   a second call center coupled to the data network and a second call receptor coupled to the data network, wherein the first and second call centers are also coupled to a voice network; and
   a network transfer module coupled to the data network, the network transfer module communicating with the first call receptor and the second call receptor, wherein the second call receptor establishes a time acceptance window that is utilized to accept a transferred voice call.

2. The telecommunications system of claim 1, wherein only voice information is communicated on the voice network.

3. The telecommunications system of claim 1, wherein no ANI or DNIS information is communicated on the voice network.

4. The telecommunications system of claim 1, wherein the first and second call receptors are software modules executed by a first server and a second server, respectively.

5. The telecommunications system of claim 1, wherein the network transfer module is a software module executed by a third server coupled to the data network.

6. The telecommunications system of claim 1, wherein the network transfer module generates a control point identifier associated with a control point address within the second call center.

7. The method of claim 1, wherein the time acceptance window includes an activation time and an expiration time.

8. The method of claim 7, wherein the activation time establishes the earliest time that the transferred voice call is accepted at the second call receptor and the expiration time establishes the latest time the transferred voice call is accepted at the second call receptor.

9. The method of claim 8, wherein the activation time establishes the earliest time the transferred voice call may arrive at the second call receptor and the expiration time establishes the latest time the transferred voice call may be answered at the second call receptor.

10. The method of claims 7, wherein the activation time and the expiration time are computed by utilizing a user adjustable parameter.

11. A telecommunications system including:
    a call center;
    a data network; and
    a voice network, wherein the call center is coupled to the data network and the voice network, wherein the call center associates data with a call and wherein during a transfer of the call over the voice network and a transfer of data associated with the call over the data network, only voice information is communicated on the voice network and wherein a time acceptance window-is established and utilized to accept the call.

12. The telecommunications system of claim 11, wherein no ANI or DNIS information is communicated on the voice network.

13. The telecommunications system of claim 11, further including a network transfer module coupled to the data network, wherein the network transfer module communicates with a first call receptor and a second call receptor.

14. The telecommunications system of claim 11, further including a network transfer module coupled to the data network, wherein the network transfer module is a software module executed by a server coupled to the data network.

15. The telecommunications system of claim 11, further including a network transfer module coupled to the data network, wherein the network transfer module generates a control point identifier associated with a control point address within a call center.

16. A method for transferring a voice call and associated data from a first call center to a second call center, the method including:
  receiving a voice call at the first call center;
  sending a transfer request to a network transfer module;
  receiving a control point identifier from the network transfer module that identifies a control point address in the second call center;
  sending the data and the associated control point address to the second call center;
  directing the voice call to the control point address wherein the second call center establishes a time acceptance window that is utilized to accept the transfered voice call.

17. The method of claim 16, further including receiving the voice call at the control point within the second call center and associating the voice call with the data.

18. A method for transferring a voice call and data associated with the voice call between a call processing domain and a client domain, the method including:
  receiving a voice call over a voice network at the call processing domain;
  sending a transfer request to a network transfer module over a data network;
  receiving a control point identifier from the network transfer module, wherein the control point identifier identifies a control point address in the client domain to the call processing domain;
  sending the data to the client domain and associating the data with a control point identified by the control point identifier;
  directing the voice call from the call processing domain to the control point address within the client domain wherein the client domain establishes a time acceptance window that is utilized to accept the transfered voice call.

19. The method of claim 18, further including receiving the voice call at the control point within the client domain and associating the voice call with the data.

20. The method of claim 18, wherein the call processing domain includes a first call center and the client domain includes a second call center.

21. A telecommunications system including:
  a first means;
  a second means; and
  a third means;
  wherein the first means is coupled to the second means and the third means, wherein the first means associates data with a call; and wherein during a transfer of the call over the third means and a transfer of data associated with the call over the second means, only voice information is communicated on the third means and wherein a time acceptance window is established and utilized to accept the transfered call.

22. A machine readable medium storing a set of instructions that, when executed by the machine, cause the machine to:
  receive a voice call at the first call center;
  send a transfer request to a network transfer module;
  receive a control point identifier from the network transfer module that identifies a control point address in the second call center;
  send the data and the associated control point address to the second call center;
  direct the voice call to the control point address wherein the second call center establishes a time acceptance window that is utilized to accept the transfered voice call.

23. A machine readable medium storing a set of instructions that, when executed by the machine, cause the machine to:
  receive a voice call over a voice network at the call processing domain;
  send a transfer request to a network transfer module over a data network; receive a control point identifier from the network transfer module, wherein the control point identifier identifies a control point address in the client domain to the call processing domain;
  send the data to the client domain and associating the data with a control point identified by the control point identifier;
  direct the voice call from the call processing domain to the control point address within the client domain, wherein the client domain is to establish a time acceptance window that is utilized to accept the transfered voice call.

* * * * *